US006868534B2

(12) United States Patent
Fattouh et al.

(10) Patent No.: US 6,868,534 B2
(45) Date of Patent: Mar. 15, 2005

(54) CIRCUIT MODELING

(75) Inventors: Farag Fattouh, Folsom, CA (US); Salem Abdennadher, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 469 days.

(21) Appl. No.: 10/099,587

(22) Filed: Mar. 13, 2002

(65) Prior Publication Data

US 2003/0177427 A1 Sep. 18, 2003

(51) Int. Cl.[7] .............................................. G06F 17/50
(52) U.S. Cl. ............................................ 716/6; 716/1
(58) Field of Search ........................................ 716/6, 1

(56) References Cited

U.S. PATENT DOCUMENTS

| | | | |
|---|---|---|---|
| 6,212,490 B1 * | 4/2001 | Li et al. ........................ | 703/14 |
| 6,327,542 B1 * | 12/2001 | McBride ...................... | 702/64 |
| 6,577,992 B1 * | 6/2003 | Tcherniaev et al. ........... | 703/14 |
| 6,751,744 B1 * | 6/2004 | Allen et al. .................. | 713/401 |

* cited by examiner

Primary Examiner—Vuthe Siek
Assistant Examiner—Magid Y. Dimyan
(74) Attorney, Agent, or Firm—Fish & Richardson P.C.

(57) ABSTRACT

Modeling a circuit includes producing a first behavioral model of a circuit based on a transistor model of the circuit. A second behavioral model is produced of a noise source coupled to the circuit based on the first behavioral model and based on a transistor model of the noise source. A response of the second behavioral model to an input signal is generated.

30 Claims, 9 Drawing Sheets

CIRCUIT MODELING

BACKGROUND

This invention relates to circuit modeling.

An integrated circuit (IC) can include timing circuits. An example of a timing circuit is a Phase Lock Loop (PLL) that could be used for clock synthesis or clock and data recovery from an incoming signal. The most critical component of the PLL could be the Voltage Controlled Oscillator (VCO) circuit. A VCO circuit can generate an output signal having a frequency that can be adjusted over a range controlled by input control signal(s). The timing circuit may have mixed-signal characteristics represented by digital and analog signals. During the design phases, the timing circuit may have to be modeled, simulated and fabricated to accurately determine the response of the circuit. The timing circuit may be sensitive to noise and may be tested to determine whether the circuit meets predetermined specifications including timing variations such as jitter.

DETAILED DESCRIPTION

Figure 1:
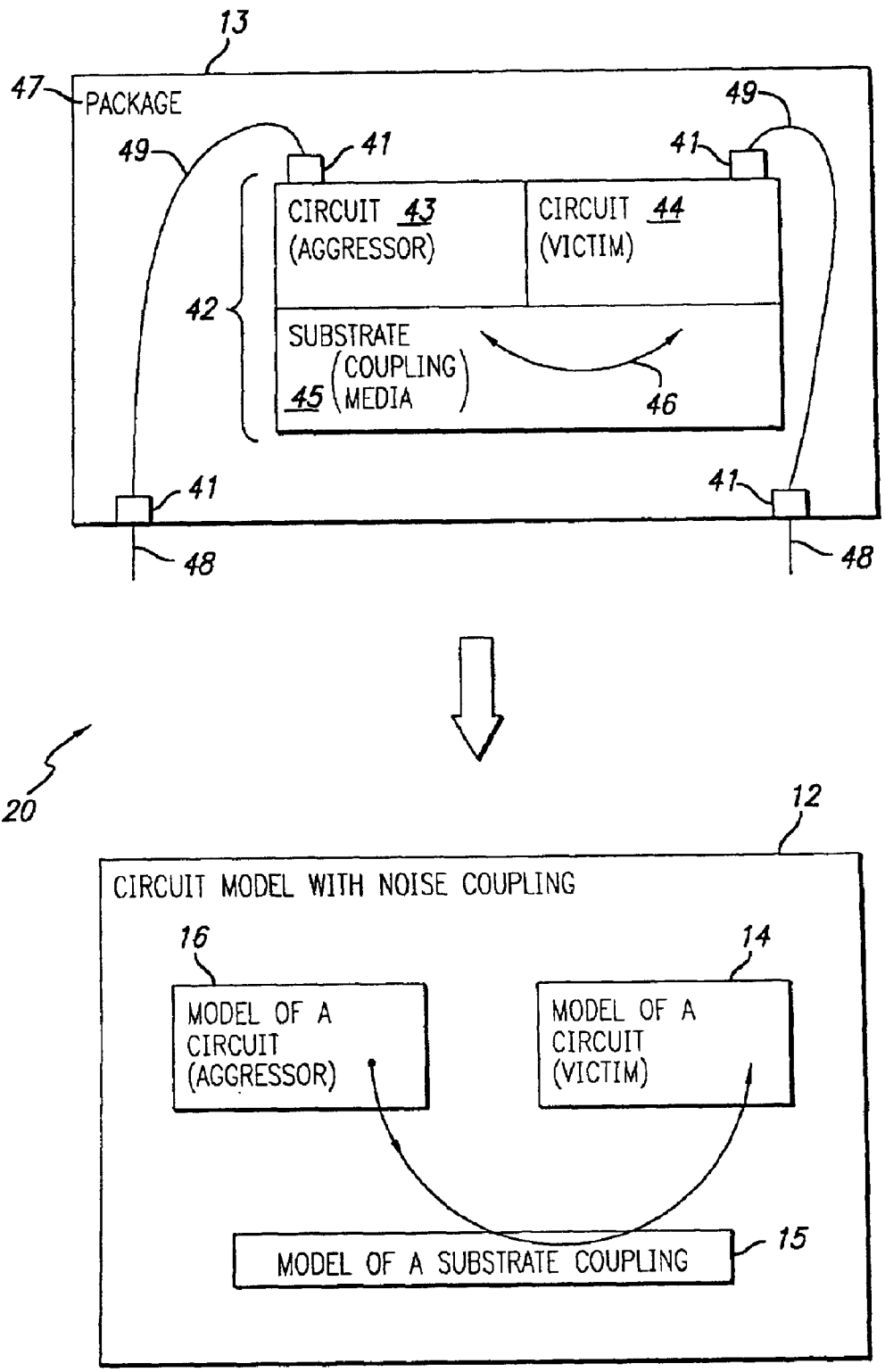
FIG. 1 is a block diagram of a model of a circuit.

FIG. 1 shows the relationship between an IC 13 and a circuit model 12 of a circuit in the IC with noise modeling capability. The IC 13 includes a package 47 for housing a chip 42 having circuits 43, 44, formed on a substrate 45 of semiconductor material. The noise capable model 12 includes a victim (noise affected) circuit model 14 representing circuit such as the circuit 44 and it includes an aggressor (noise source generator) circuit model 16 representing circuit such as the circuit 43. The noise capable model 12 also includes a model of noise coupling media 15 such as the model representing substrate circuit 45. The substrate noise coupling model 15 models the behavior of the substrate acting as a coupling circuit between the noise generating (aggressor) model 16 and the noise affected (victim) model 14. Although in this implementation the substrate circuit 45 is used as the coupling media, the same technique is applicable to other implementations where the coupling is through media other than the substrate 45.

The IC 13 includes bond wires 49 that are attached to the chip 42 and to pins 48 through bond pads 41. The pins 48 deliver power signals over the bond wires 49 to power the circuits 43, 44 and provide for the exchange of data signals with the circuits.

As shown by the arrow 46, the substrate 45 can act as a media for coupling noise between the circuits 43, 44. The circuit 43 can act as a noise source as it operates and this noise may be coupled to the circuit 44 through the substrate 45. Other sources of noise can be coupled to the circuit 44 through the substrate 45 such as noise due to variations in power supply signals, noise due to cross talk from other signals and noise due to digital switching.

Using the noise model 12 to evaluate various noise reduction techniques can help to reduce the effects of noise coupled through the substrate 45. Examples of such noise reduction techniques include adding shielding between analog and digital circuits, using assembly and packaging techniques to reduce parasitic effects and reducing the switching power consumed by the circuits. The noise model 12 is described in further detail below.

An example of IC 13 includes a telecommunications IC such as a synchronous optical network/synchronous digital hierarchy (SONET/SDH) optical carrier level 3 (OC-3) transceiver with VCO circuits operating at around 1.2 giga-hertz (GHz). The IC 13 circuit can include transmit and receive VCO circuits as part of transmit and receive PLL circuit respectively.

Figure 2:
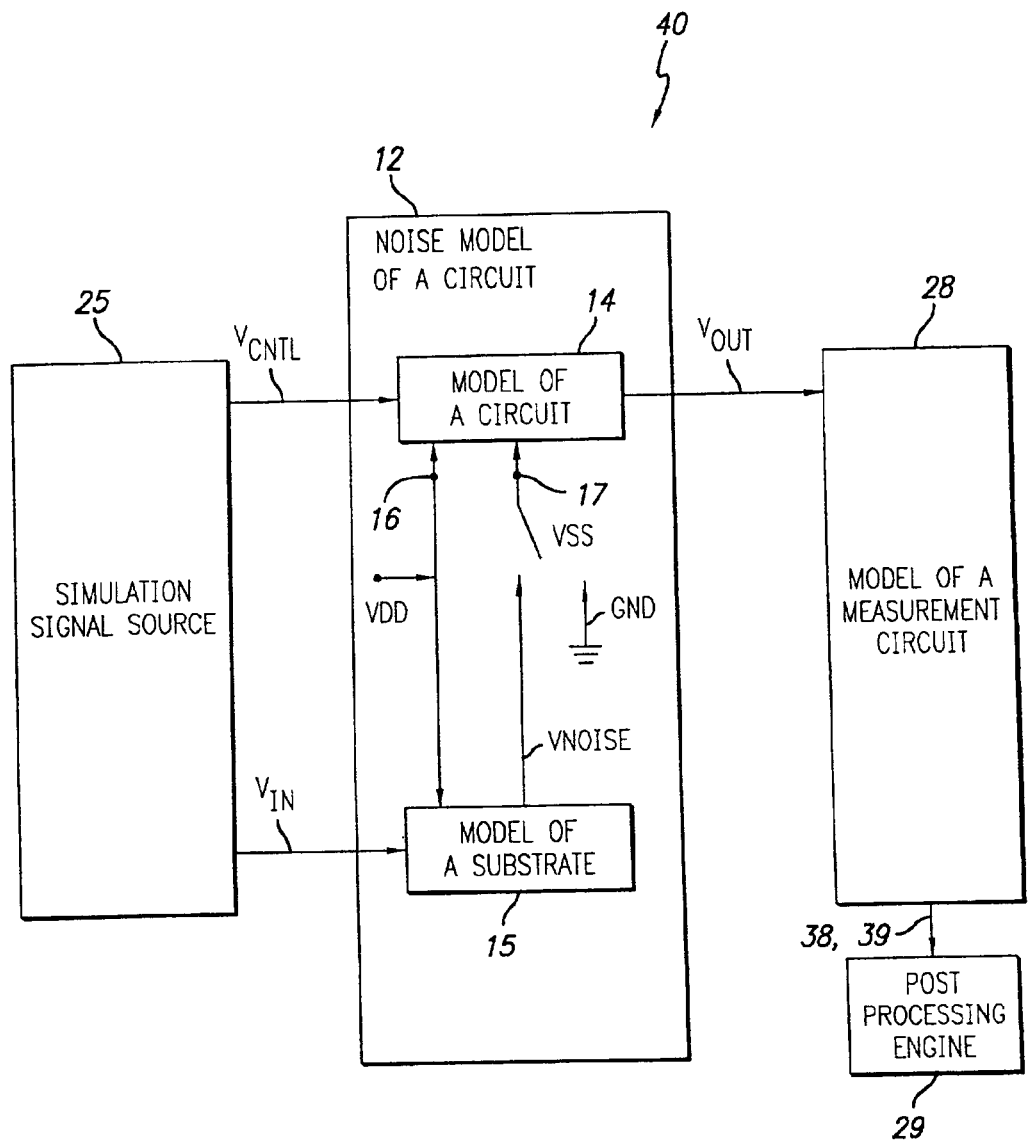
FIG. 2 is a block diagram of a circuit modeling system.

Referring to FIG. 2, a noise modeling system 40 includes a measurement model 28 to measure the response of the noise model 12 to simulation signals from a simulation signal source 25.

A power supply (VDD) signal is connected to a power supply node 16 of the victim circuit model 14 and the substrate model 15. The circuit model 14 includes a substrate-grounding (VSS) node 17, which is normally connected to a ground point (GND) to isolate the noise effects of the substrate model 15. This is useful when the circuit model 14 is tested to determine the response of the model without the noise effects of the substrate model 15. In contrast, the substrate-grounding (VSS) node 17 is connected to an output noise (VNOISE) signal from the substrate model 15 when the circuit model 14 is tested to determine the noise effects of the substrate model.

The coupling through the substrate model 15 generates the VNOISE signal in response to an input noise voltage signal (VIN) from the simulation signal source 25. The VNOISE signal represents the noise from the substrate model 15 coupled to the circuit model 14. The simulation signal source 25 generates an input control signal (VCNTL) signal to the circuit model 14. The circuit model 14 generates an output signal (VOUT) based on the response of the model to the combination of VCNTL signal and the VNOISE signal.

The measurement model 28 can be used to measure the waveform of the VOUT signal, and a post-processing engine 29 can be used to calculate various metrics based on the measurements. The metrics can include noise related calculations, which can be evaluated during the circuit design phase. The circuit designer could use these metrics to estimate the performance of the design and make necessary design changes (i.e. optimize the design) to minimize the effects of noise on the circuit model 14 coupled through the substrate model 15 in order to meet the specification and increase the quality/cost-effectiveness of the design.

In one embodiment, the noise modeling system 40 can be used to model a VCO circuit and the noise effects due to a substrate coupled to the VCO circuit. The VOUT signal can represent an output signal waveform having a frequency based on the VCNTL signal and the noise effects of the substrate represented by the VNOISE signal. The VOUT signal is a periodic waveform that can be measured using the measurement model 28 implemented as a time-to-digital-converter (TDC). The measurement model 28 produces count values 38, 39 that represent the period data related to the VOUT signal. The post-processing engine 29 then calculates timing related metrics such as jitter based on the period measurements.

Figure 3:
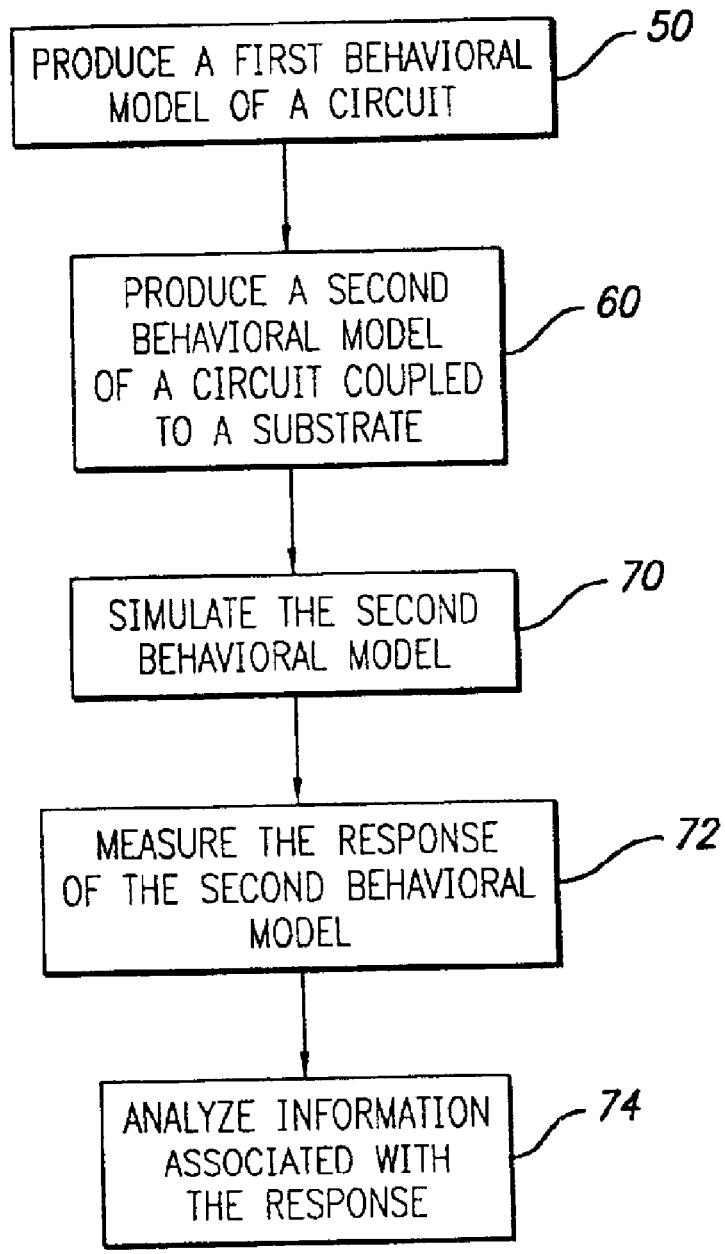
FIG. 3 is a high level flow chart for producing a behavioral model of a circuit.

Referring to FIG. 3, in one embodiment, a first behavioral circuit model based on the circuit model 14 is produced 50. For example, the first behavioral circuit model can be produced using a mathematical function representing a circuit description of the transistor circuit model and a hardware description language (HDL) such as very high-speed integrated circuits hardware description language (VHDL) with analog and mixed signal extension (VHDL-AMS). The first behavioral model represents the circuit without noise coupled through the substrate. It is used as a reference to quantify the variation of circuit performance when noise effects are taken into consideration.

Once the first behavioral circuit model is produced, a second behavioral circuit model based on the noise model 12 is produced 60. The second behavioral circuit model is based on the first (noiseless) behavioral circuit model and on a transistor circuit model of the substrate coupled to the circuit. The second behavioral circuit model can be produced using a mathematical function representing a circuit description of the transistor circuit model of the circuit coupled to a substrate. HDL can be used to create the second behavioral model.

Input signals from the simulation signal source 25 can be applied to the second behavioral circuit model to simulate 70 a response by the model. The second behavioral circuit model generates a response that includes the noise effects of the circuit coupled to the substrate. The measurement model 28 measures 72 the response of the second behavioral circuit model and produce count signals 38, 39 (FIG. 2) representing timing information. The post-processing engine 29 receives the timing information and analyses 74 the information.

Figure 4:
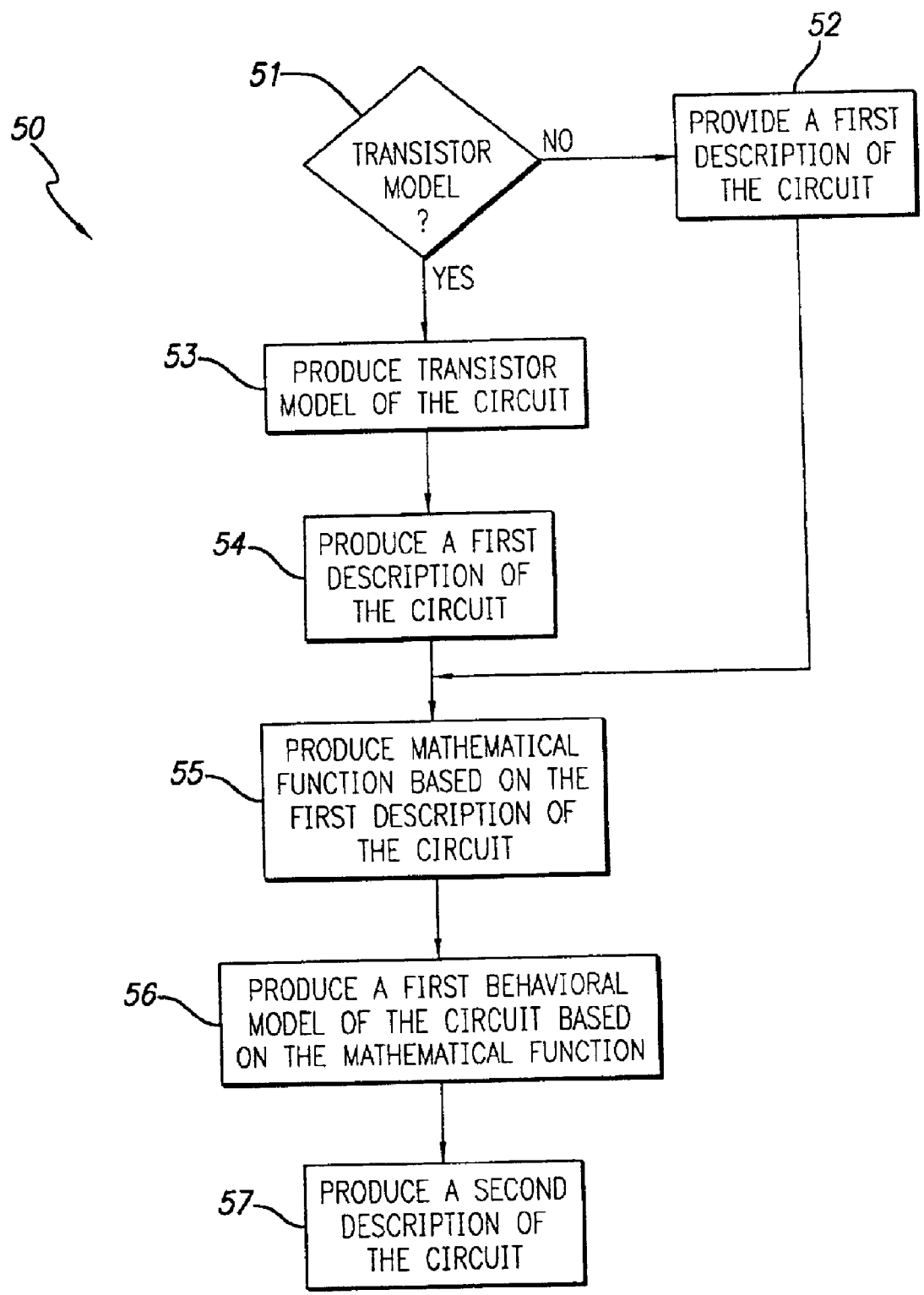
FIG. 4 is a detailed flow chart for producing a behavioral model of a circuit.

Referring to FIG. 4, flow chart 50 provides a more detailed description of the process block 50 shown in FIG. 3. To produce the first behavioral circuit model, a query is made 51 as to whether a transistor model is provided. If a transistor circuit is not available, a first circuit description of the circuit can be provided 52 based, for example, on the circuit specification. An example of a first circuit description can include a transfer function such as a curve or table representing the relationship between the input and output of the circuit. The transfer function can include a table of entries where each entry contains a value of an input signal and a value of an expected output signal in response to the input signal. In the VCO circuit example, the transfer function can include entries where each entry has a voltage value of an input signal and a desired frequency value of an output signal in response to the input signal. Each entry in the table can be used to plot a curve with voltage on the x-axis and frequency on the y-axis.

The first circuit description can be provided before the circuit has been designed. The use of the first circuit description allows a behavioral circuit model to be produced before or in lieu of the transistor circuit model. Once the first circuit description is available, processing proceeds to block 55 where a mathematical function based on the circuit description is produced. Such processing is described in further detail below.

On the other hand if the results of the query 51 indicate that a first circuit description is provided, then a transistor circuit model is produced 53. The transistor circuit model can be produced using HDL. HDL uses representations of circuit components, such as transistors, resistors, capacitors or other circuit components to model a circuit. The circuit components can be coupled together using an HDL editor and can be compiled using an HDL compiler to produce a netlist output of the transistor circuit model.

Once the transistor circuit model is produced, a first circuit description is produced 54. The first circuit description can be produced using a simulation program that receives the netlist output and performs a steady state analysis on the netlist output. An example of a simulation program is Eldo™ radio-frequency (RF) program from Mentor Graphics®. The simulation program produces the first circuit description by applying input signals to the input of the transistor circuit model and generating output signals representing the response of the model.

For example, in a transistor circuit model of a VCO circuit, the input signals can be direct current (DC) voltage signals that are varied over a range of operation of the VCO circuit. The range of operation can include minimum and maximum values based on the design of the VCO circuit and the target fabrication process. By sweeping the value of the input signal with incremental steps from the minimum to the maximum value range, the simulation program produce a table representing the frequency of the VCO output signal for each value of the input signal.

Figure 5:
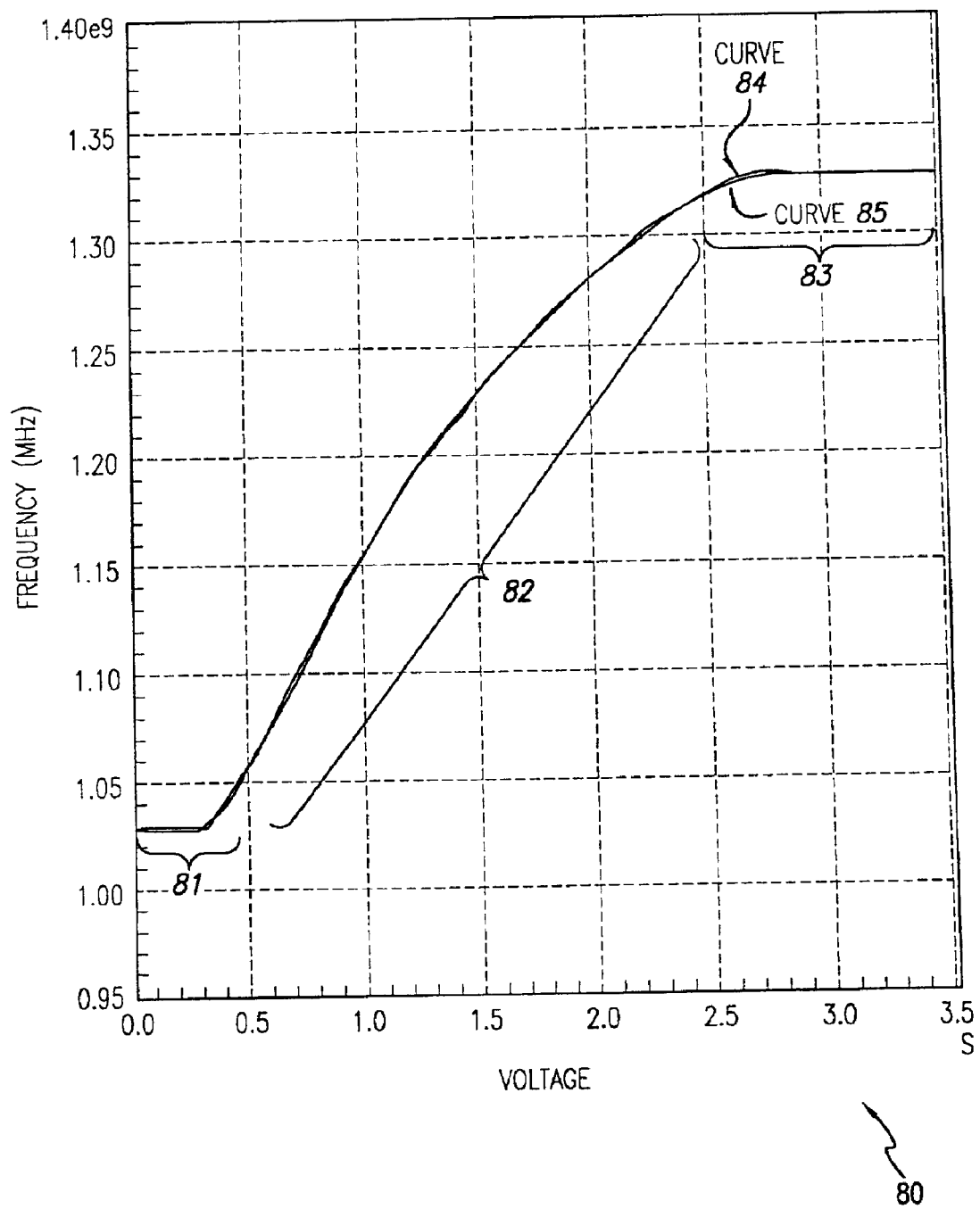
FIG. 5 is a graph representing transfer functions of a transistor model and a behavioral model of a circuit.

The output of the simulation program can be used to produce the first circuit description. Such a circuit description can include a transfer function in the form of a table with entries where each entry contains a voltage value of an input signal and a frequency value of an output signal generated in response to the input signal. Referring to FIG. 5, a graph 80 of transfer function is shown having x-axis representing voltage values of the input signals ranging from approximately 0 to 3.5 volts for a particular fabrication process. The y-axis represents frequency values of the output signal ranging from approximately 1.0 to 1.35 GHz. Graph 80 represent two curves 84, 85 laid on top of each other. Curve 84 is a plot of a transfer function of the transistor circuit model of the VCO circuit. As discussed in detail below, curve 85 is a plot of a transfer function of the circuit based on the simulation results of a behavioral circuit model of the VCO circuit.

Referring back to FIG. 4, once the first circuit description is produced, a mathematical function based on the first circuit description is produced 55. For example, a mathematical analysis program can apply a fitting algorithm to the first circuit description to generate a mathematical function representing the behavior of the circuit. An example of a mathematical analysis program is Matlab™ from Mathworks.

In one embodiment, a mathematical function can include a polynomial function with coefficients. The order of the polynomial function may depend on the desired accuracy of the mathematical function. For example, referring to FIG. 5, the first circuit description of the VCO circuit can be represented by the curve 84 having a main operating region 82 corresponding to a region where the VCO operates in a substantially close to linear manner. On the other hand, a high-end region 83 and a low-end region 81 represent regions of operation where the VCO circuit does not operate in a substantially linear manner. A high order polynomial function, such as a fifth order function, may be required to adequately represent the main operating range 82 as well as the high-end region 83 and the low-end region 81 of operation. An example of a fifth order polynomial function y1 is given by the following equation:

$$y1=k14(s^4)+k13(s^3)+k12(s^2)+k11(s^1)+k10(s^0) \qquad (1)$$

where the terms $(s^4)$, $(s^3)$, $(s^2)$, $(s^1)$, and $(s^0)$ are Laplace variables representing frequency domain variables composed of complex components having real and imaginary parts. The terms k14, k13, k12, k11, and k10 are coefficients each of which is associated with a respective Laplace variable. The fifth order polynomial function (y1) represents the behavior of the circuit in the frequency domain as a function of frequency (f). The function (y1) can be transformed into the time domain by transforming the Laplace variables from the frequency domain into the time domain. In the time domain, each Laplace term may include sine and cosine terms as a function of time (t) instead of frequency (f) as in the frequency domain.

Once the mathematical function is produced, a first behavioral circuit model is produced 56. The first circuit behavioral model can be produced using HDL to transform the mathematical function, such as the polynomial function described above, into HDL format. The first behavioral circuit model can be produced using HDL such VHDL. VHDL is a standard (VHDL-1076) developed by the Institute of Electrical and Electronics Engineers (IEEE). A mixed signal extension of VHDL, such as VHDL analog mixed signal (VHDL_AMS), may be more appropriate because the circuit model 12 is a mixed signal circuit using both digital and analog signals and since VHDL may only be capable of handling digital signals.

In contrast to the use of VHDL which provides a high level of abstraction, a transistor circuit model can be used which provides lower level of abstraction. For example, the transistor circuit model can be based on a structural representation of the circuit using circuit components such as resistors, capacitors, transistors and other components. SPICE syntax is an example HDL that can be used to create such a structural representation.

As discussed below, the substrate can be modeled at a lower level of abstraction compared to the transistor and behavioral level. For example, the substrate can be modeled at the electron flow level using an electromagnetic analysis program. Although the modeling and simulation results are more accurate as the level of abstraction is decreased, the time to simulate the model at such a lower level also tends to increase.

Once the first behavioral circuit model is produced, a second circuit description of the circuit is created 57 in a similar manner used to generate the first circuit description of the transistor model described above. In this case, the second circuit description is based, in part, on the first behavioral circuit model of the circuit. A VHDL compiler can be used to compile the first behavioral model generating a netlist output. A simulation program receives the netlist output and produces the second circuit description by applying input signals to the input of the model and producing output signals representing the response of the model.

In the VCO circuit example, the second circuit description is similar to the first circuit description except that the second circuit description represents the response of the behavioral circuit model instead of the response of transistor circuit model. Referring to FIG. 5, curve 84 represents the plot of the first circuit description of the transistor circuit model whereas curve 85 represents a plot of the second circuit description of the behavioral circuit model. The graph 80 shows that curve 85 substantially approximates curve 84 because the first behavioral circuit model substantially approximates the transistor circuit model. The response of the behavioral circuit model and the transistor circuit model can be adjusted to better approximate the response of each model. The behavioral circuit model can be used in a subsequent process for producing the second behavioral circuit model representing a substrate coupled to the circuit.

Figure 6:
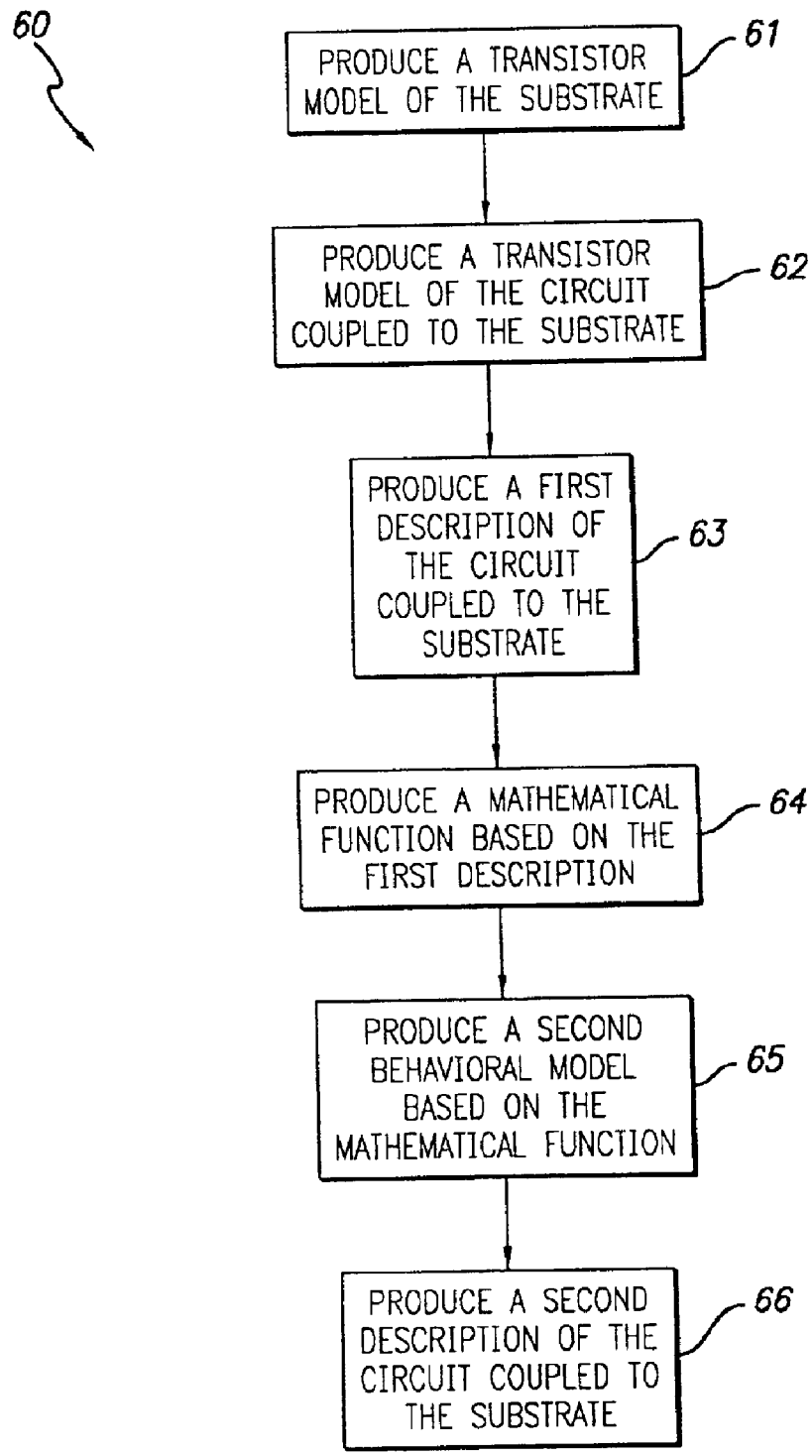
FIG. 6 is a detailed flow chart for producing a behavioral model of a circuit.

Referring to FIG. 6, flow chart 60 provides a more detailed description of the process block 60 in FIG. 3. A transistor circuit model of a substrate is generated 61 using, for example, HDL. The accuracy of the circuit model of the substrate 45 can be increased by including physical properties of the substrate and connection to/from external pins (FIG. 1). Such properties can include the package model and the dimensional aspects of the substrate such as the width, depth, and height. These characteristics can be modeled using an electromagnetic analysis program that takes into account the 3-dimensional aspects of these characteristics at the electron flow level. An example of electromagnetic analysis program includes Maxwell™ from Ansoft.

Other substrate-related characteristics could be incorporated into the substrate circuit model. For example, characteristics regarding substrate doping, guard rings, power rails, substrate backside connections, pads and package floor planning may be incorporated into the substrate circuit model. The substrate is coupled to the circuit at various contact points, which may be represented as input/output connections in the model. To reduce the complexity of the substrate circuit model, the number of contact points used in the model can be reduced without sacrificing accuracy. It may be sufficient to limit the number of contact points to certain areas of interest such as where the substrate is coupled to a ground and power supply.

Once the substrate circuit model is produced, a transistor circuit model of the circuit coupled to the substrate is produced 62. This transistor circuit model is produced by combining the circuit model of the substrate discussed in block 61 with the transistor circuit model of the circuit discussed in block 53 (FIG. 4).

HDL can be used to specify the combined transistor circuit and substrate model and a HDL editor can be used to combine the two transistor models. For example, referring to FIG. 2, combining these two models can be represented by connecting the VNOISE signal from the substrate model 15 to the substrate grounding node 17 of the circuit model 14. This connection allows the noise effects of the substrate model 15 to be coupled to the circuit model 14. A HDL compiler can be used to compile the combined transistor model to produce a netlist output.

Once the transistor circuit model of the circuit coupled to the substrate is produced, a first circuit description is produced 63 based on the transistor model. Referring to FIG. 2, in the VCO circuit example, the first circuit description can be a transfer function in the form of a table containing groups of entries. Each group can include values of the VOUT signal representing the output frequency of the VCO at a particular value of the VCNTL signal as the value of the VIN signal is varied over a range such as from +100 millivolts (mV) to −100 mV. The transfer function represents the input/output characteristics of the VCO circuit with the effects of noise coupled to the circuit. The use of a reasonable sweep range (100 mv to −100 mv) for VIN in the VCO simulation is to enable the characterization of VCO model with the noise coupling effects included.

Figure 7:
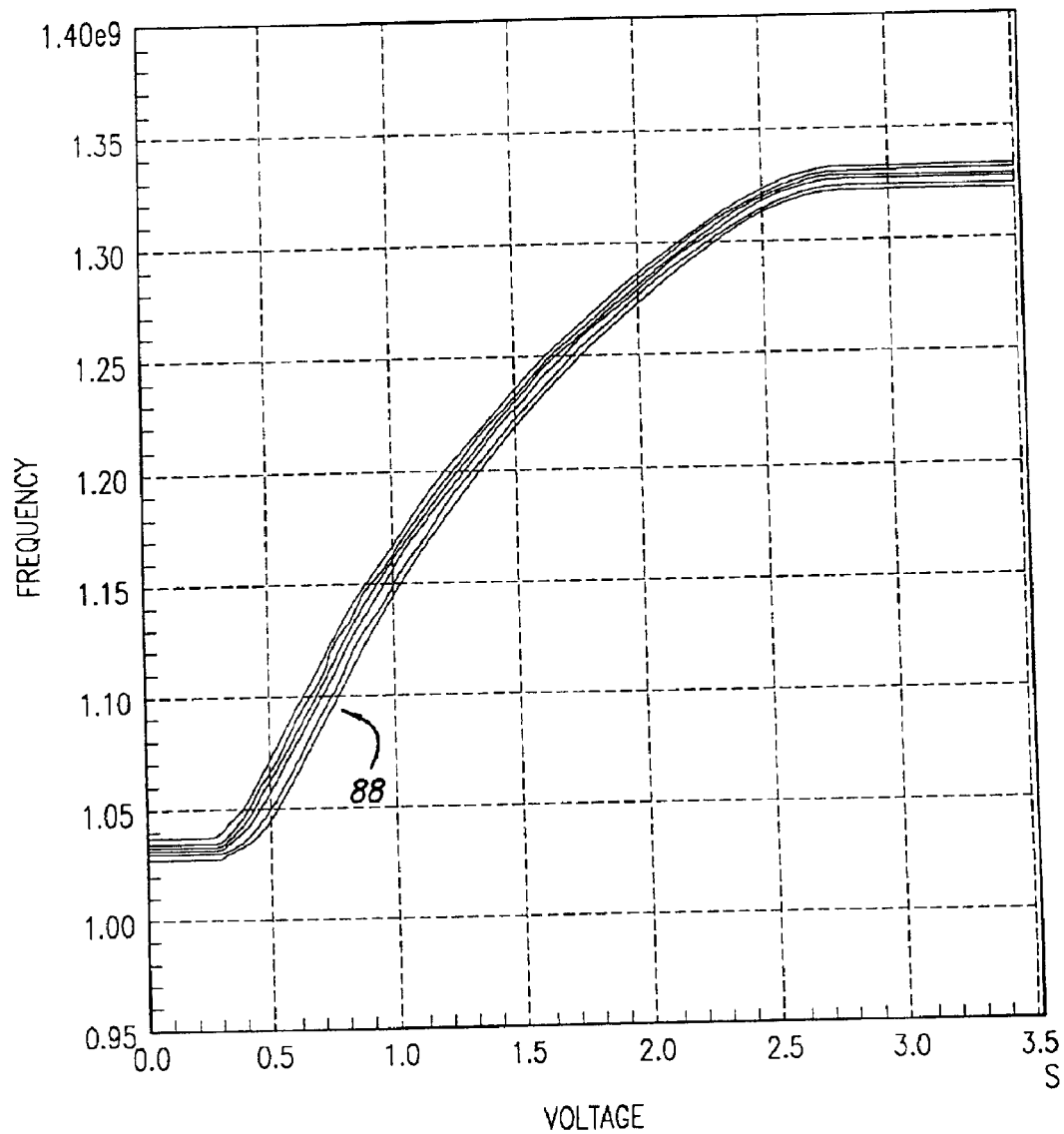
FIG. 7 is a graph representing transfer functions of a transistor model of a circuit.

Referring to FIG. 7, graph 87 shows a group of curves 88 representing the transfer functions discussed above. The x-axis represents voltage values of the VCNTL signal applied to the VCO circuit and the y-axis represents frequency values of the VOUT signal generated by the VCO circuit in response to the VCNTL signal. Each curve is generated at a particular value during the sweep of VIN signal. The group of curves 88 can be interpreted as frequency deviation of the VCO output in response to the signal variation of the substrate connection node 17, over the operating range of input control signal, VCNTL.

In order to model the effect of noise coupled through the substrate, a set of tables of derivatives of the frequency of the output signal, VOUT, with respect to VNOISE can be produced at several values of the VCTRL signal taken over the operating voltage range. As discussed below in detail, the mathematical analysis program to produce a mathematical function representing the behavioral of the substrate as a noise source can use the table of derivatives and the transfer function.

An example mathematical function can include a polynomial function with coefficients. The order of the polynomial function can depend, for example, on the desired accuracy of the mathematical function. In this case, a second order polynomial function may be adequate to represent the added noise effects of the substrate coupled to the circuit. An example second order polynomial function y2 is given by the following equation:

$$y2 = k21(s^1) + k20(s^0) \qquad (2)$$

where the terms $(s^1)$ and $(s^0)$ are Laplace variables representing frequency domain variables composed of complex components having real and imaginary parts. The terms k21 and k20 are coefficients each of which is associated with a respective Laplace variable. The second order polynomial function (y2) represents the added noise behavior of the substrate coupling in the frequency domain as a function of frequency (f). Using the same mathematical analysis program, Matlab™, can produce the values for k21 and k20 based on the tables of derivatives generated by sweeping VNOISE as discussed above.

Once the mathematical function is produced, a second behavioral model is produced 65. The second behavioral model can be produced by combining the second order polynomial function (y2) with the fifth order polynomial function (y1) to produce a polynomial function (y3). The resulting polynomial function (y3) includes the two sets of coefficients from the two respective polynomial functions (y1), (y2).

Once the second behavioral model is produced, a second circuit description is produce 66. A process similar to the process used to produce the first circuit description described in block 63 above is employed here to produce the second circuit description. The response of the second circuit description can be represented by a curve which can be compared with the curve produced by the first circuit description to ensure that the second circuit description substantially approximates the first circuit description. The above process can be repeated to produce a second behavioral model that more closely approximates the transistor model with the substrate noise coupling effects included.

Figure 8:
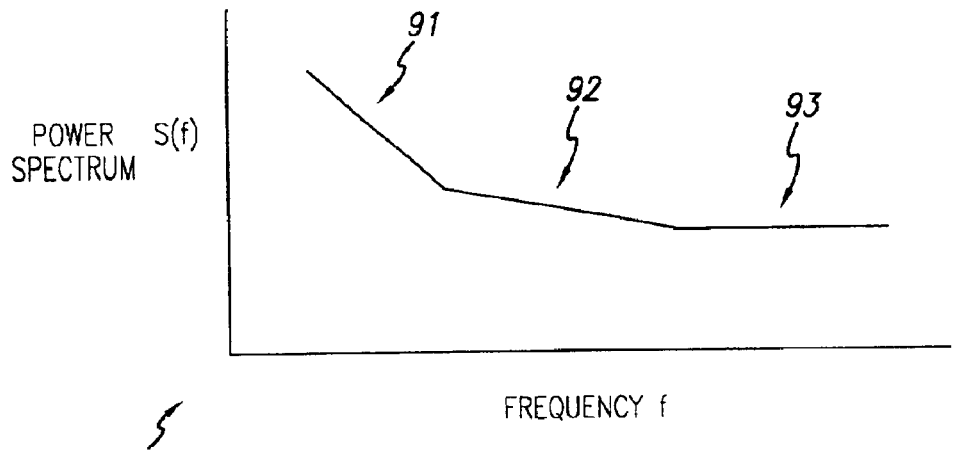
FIG. 8 is a graph of a frequency spectrum of noise in a circuit.

Referring to FIG. 8, graph 90 is a frequency domain representation of the transfer function discussed above showing how the energy of noise is disturbed over a frequency range. In the VCO circuit example, the x-axis represents the frequency f of the noise coupled to the VCO circuit, and the y-axis represents the power spectrum S(f) of the output of the VCO circuit that includes the effects of noise coupled to the circuit. Noise sources in oscillator circuits, such as VCO circuits, can be divided into device noise and interference noise. Device noise can include thermal noise, shot noise and flicker noise. Interference noise can include substrate noise and power supply noise. These noise sources are characterized as being random and deterministic causing phase and amplitude variations with the oscillators.

The graph 90 illustrates a first region 91 having a slope of 1/f3, a second region 92 having a slope of 1/f2 and a third region 93 representing white noise having a slope of 1/f. The noise illustrated in the graph 90 may contribute to VCO circuit disturbances including shifts in the output frequency from a specified frequency causing timing variations such as jitter.

Referring back to FIG. 3, once the second behavioral model of a circuit coupled to a substrate is produced, the second behavioral model is simulated 70. Referring to FIG. 2, the input signals from a simulation signal source can be applied to the second behavioral model to generate a response by the model. The second behavioral model generates a response that includes the noise effects of the substrate coupled to the circuit.

Figure 9:
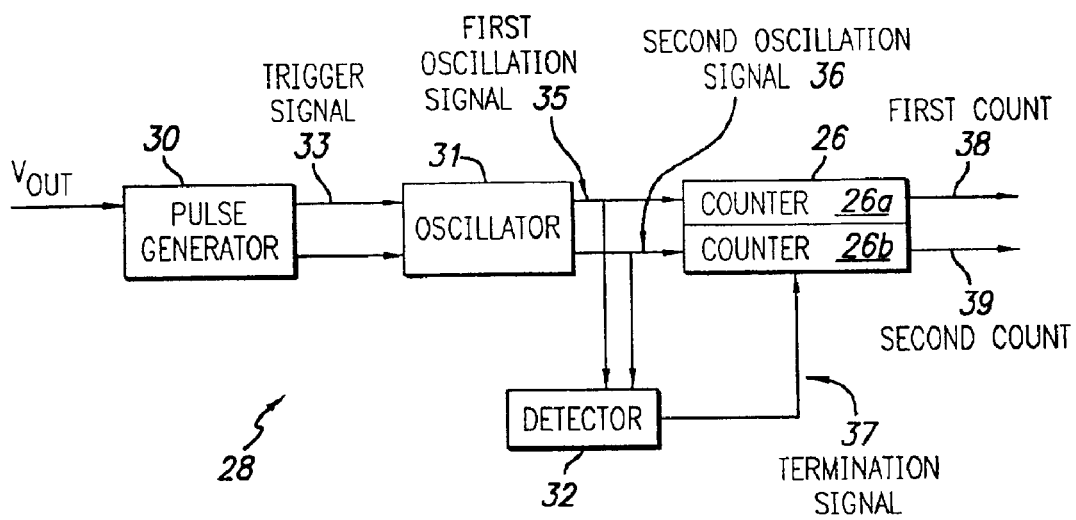
FIG. 9 is a block diagram of a model of a measurement circuit.

Referring back to FIG. 3, the response of the second behavioral model can be measured 80 by the measurement model 28. Referring to FIG. 9, the measurement model 28 can be, in one embodiment, a TDC that includes a pulse generator 30, an oscillator 31, a detector 32 and counters 26a, 26b. The measurement model 28 can be modeled using HDL and simulated using a simulation program.

In general, the model 28 receives the VOUT signal and produces output signals corresponding to a first count 38 and a second count 39. The count data represents timing information associated with the VOUT signal. The model 28 can repeatedly produce count data 38, 39 which can be delivered to the post processing engine 29. The post-processing engine 29 receives the count data 38, 39 and generates a histogram based on the repeated measurement data representing timing variations, such as jitter, of the signal waveform.

In operation, a trigger signal 33 is generated by the pulse generator 30 in response to the VOUT signal. The trigger signal 33 can have the same period as the period of the VOUT signal. The trigger signal 33 is fed to the oscillator 31 which causes a first oscillation signal 35 to be generated in response to the leading edge of the trigger signal 33. Also, a second oscillation signal 36 is generated in response to the trailing edge of the trigger signal 33.

The oscillation signals 35, 36 cause the counters 26a, 26b to begin counting the pulses associated with a respective one of the oscillation signals. The detector 32 detects when the oscillation signals 35, 36 are in phase, also known as coincidence of signals, and generates termination signal 37 to the counter 26. Coincidence is defined as when the leading or trailing edge of each oscillation signal 35, 36 is in phase. The termination signal 37 causes the counters 26a, 26b to stop counting pulses of the oscillation signals 35, 36.

Once the counters 26a, 26b stop counting pulses, the counter 26 produces count values 38, 39 reflecting the number of pulses counted. Each count value 38, 38 represents the number of pulses that occurred since occurrence of the trigger signal 33 until occurrence of a coincidence. Each count value 38, 39 can be used to determine a period T associated with one of the oscillation signals 35, 36. In particular, the post-processing engine 29 can use the counts 38, 39 to determine the period T of the VOUT signal. The period T may be determined, for example, by the following equation:

$$T = n*T1 - m*T2 \quad (3)$$

in which n and m are the number of cycles indicated by the counts 38, 39, and T1, T2 are the periods of the first and second oscillation signals, respectively. If the period of the first oscillation signal 35 is greater than the period of the second oscillation signal 36, and the counts n and m are equal, which reduces equation (3) to:

$$T = n*(T1 - T2). \quad (4)$$

Once the period T is calculated, jitter analysis can be performed. In some applications, it may be necessary to perform multiple period measurements and calculations of period T to determine jitter or timing variations associated with the VOUT signal. For example, to accurately determine jitter in a T1-line application, it may be necessary to perform approximately three hundred period measurements. The post-processing engine 29 can generate a histogram of the calculated periods T.

Figure 10:
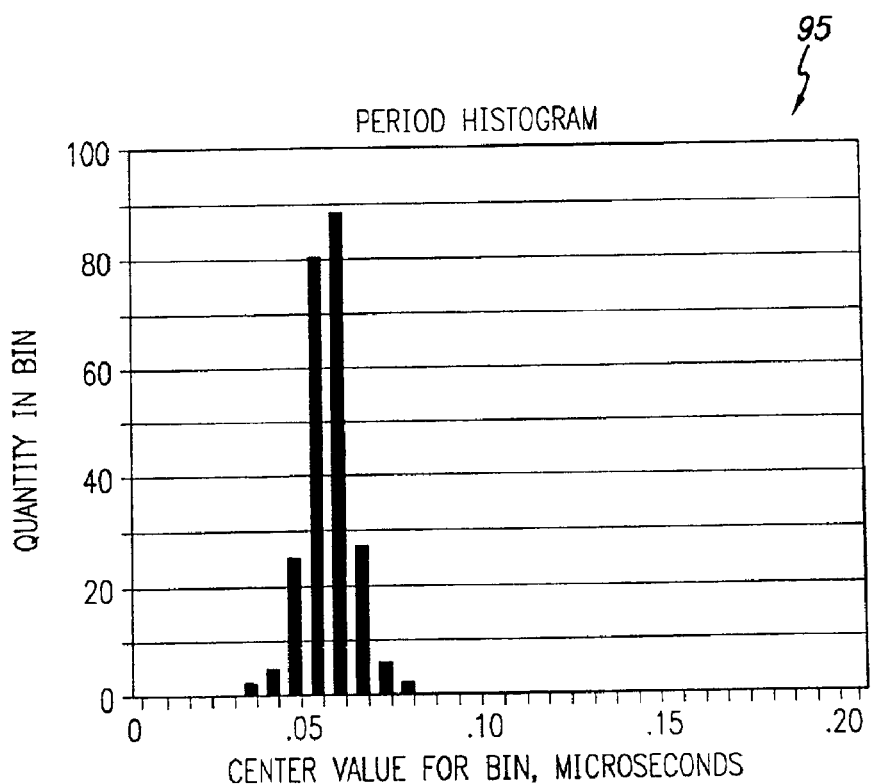
FIG. 10 is a histogram showing measurements of a model of a circuit.

Referring to FIG. 10, the histogram 95 can provide information regarding the distribution of timing variations of the periodic signals such as the VOUT signal. For example, the histogram 95 can provide insight regarding whether the jitter distribution has a gaussian distribution and allow various metrics to be calculated such as root mean square (RMS), average jitter, minimum and maximum jitter, standard deviation and variance. The metrics then can be compared to established specifications to determine whether the component meets the specifications.

Figure 11:
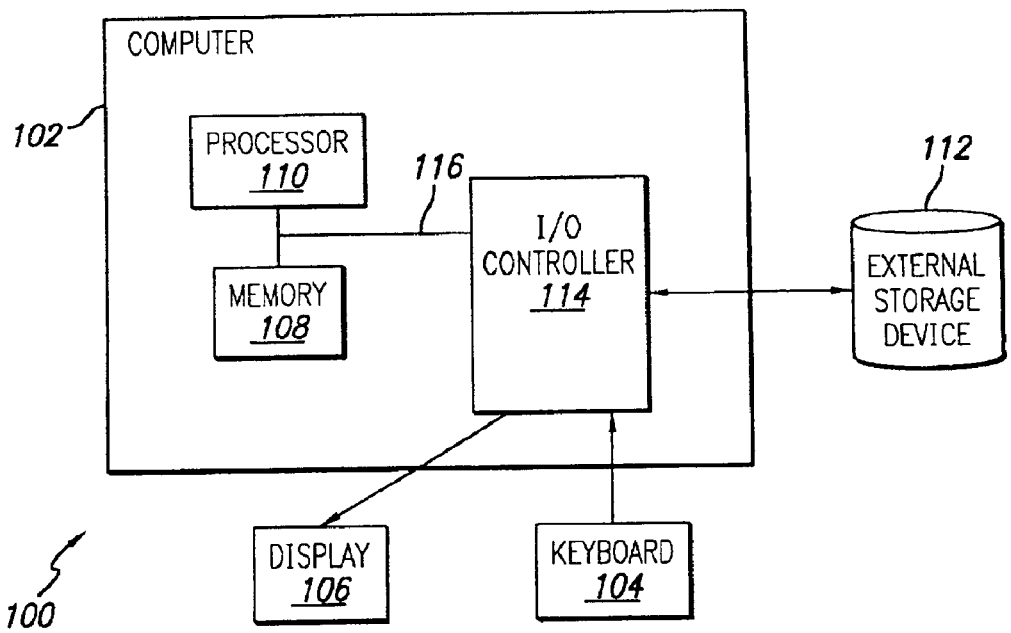
FIG. 11 is a block diagram of a computer system for implementing the techniques disclosed in the invention.

Referring to FIG. 11, a computer system 100 can be used to implement the above techniques. The computer system 100 includes a computer 102 having an input/output (I/O) controller 114 coupled to a keyboard 104 to allow a user to input to the computer information such as behavioral model information. Similarly, the I/O controller 114 is coupled to a display 106 which can be used to view information such as behavioral model information. The I/O controller 114 is coupled to an external storage device 112 configured as a file system or database for storing information such as behavioral modal information.

A memory 108 is coupled to a processor 110 over a computer bus 116. The memory 108 can store instructions that can be executed by the processor 110. Such instructions include instructions for managing the operation of the computer system 100 and for implementing the techniques discussed above. The memory 108 also can store data to be processed by the processor 110. An example of such data includes data associated with a behavioral model.

Using the foregoing techniques, a behavioral model of a circuit coupled to a substrate can be produced during the design phase of the circuit development process. The number of design iterations can be reduced because the noise effects of the circuit can be determined early in the design phase before the circuit is fabricated.

For example, the behavioral model can be simulated and the response of the model can be measured using a measurement model without the need for external measurement equipment. The measurement model can be implemented as a model of a TDC to measure timing characteristics of the noise circuit model. The measurements provide statistical data related to the impact that noise coupled to the circuit may have on timing variations such as jitter. The measurement model may provide a low cost and low complexity response measurement solution. These measurements can be used during the design phase to reduce the noise impact on the circuit caused by the substrate coupled to the circuit. The impact different noise reduction techniques may have on the circuit can be evaluated during the design phase before the circuit is fabricated.

Although the above techniques are discussed in the context of noise coupled to a circuit through a substrate, other types of noise, such as cross talk noise can be modeled and analyzed using similar techniques. For example, the effect of crosstalk coupled to a circuit can be predicted early in the design phase. This allows different crosstalk reduction techniques to be employed and the effectiveness of the techniques verified before the circuit is fabricated.

The circuit and the substrate are modeled using a behavioral model based on VHDL_AMS which allows mixed-signal circuits to be modeled. The behavioral model can be produced based on a circuit description of the circuit and the substrate before the actual design of the circuit has taken place. This may allow the circuit to be simulated before the circuit has been designed to give the designer the opportunity to evaluate the simulation results early in the design phase. By employing different noise reducing techniques and then measuring the results of simulation, the effects of the different techniques can be revealed quickly. The behavioral model is simulated using RF analysis techniques which can provide a quick response from the model compared to transient analysis techniques.

The above techniques can be used at the circuit architecture design phase where the characteristics of the VCO circuit are provided at a high level. The techniques also can be applied during the circuit design phase where decisions regarding how a particular technology is applied.

Various features of the invention can be implemented in hardware, software, or a combination of hardware and software. For example, some aspects of the system can be implemented in hardware such as an application-specific integrated circuit (ASIC), field-programmable gate array (FPGA), or other hardware. In another example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer or processor, for configuring and operating the computer when the storage medium is read by the computer to perform the functions described above.

Other implementations are within the scope of the following claims.

What is claimed is:

1. A method comprising:
   producing a first behavioral model of a circuit based on a transistor model of the circuit;
   producing a second behavioral model of a noise source of a substrate coupled to the circuit based on the first behavioral model and based on a transistor model of the noise source; and
   generating a response of the second behavioral model to an input signal from a simulation signal source.

2. The method of claim 1 wherein producing a first behavioral model of a circuit comprises producing a transfer function of the transistor model of the circuit using radio-frequency analysis techniques.

3. The method of claim 1 wherein producing a first behavioral model of a circuit comprises producing a mathematical function based on a transfer function of the transistor model of the circuit.

4. The method of claim 1 wherein producing a first behavioral model of a circuit comprises producing a mathematical function representing the behavior of the transistor model of the substrate.

5. The method of claim 1 further comprising measuring timing variations associated with the second behavioral model.

6. The method of claim 5 further comprising applying noise reduction techniques to the transistor model of the substrate based on results of measuring timing variations.

7. The method of claim 6 wherein measuring timing variations associated with the second behavioral model includes using time-to-digital-conversion techniques to measure the timing variations.

8. The method of claim 1 wherein producing a first behavioral model includes producing the first behavioral model using a hardware description language.

9. The method of claim 1 comprising producing a first behavioral model of a timing circuit.

10. The method of claim 1 comprising producing a second behavioral model of a timing circuit coupled to a substrate.

11. An article comprising a computer-readable medium that stores computer-executable instructions for causing the computer to:
produce a first behavioral model of a circuit based on a transistor model of the circuit;
produce a second behavioral model of a noise source of a substrate coupled to the circuit based on the first behavioral model and based on a transistor model of the noise source; and
generate a response of the second behavioral model to an input signal from a simulation signal source.

12. The article of claim 11 wherein the computer-readable medium stores computer-executable instructions for causing the computer to:
produce a transfer function of the transistor model of the circuit using radio-frequency analysis techniques.

13. The article of claim 11 wherein the computer-readable medium stores computer-executable instructions for causing the computer to:
produce a first behavioral model using a mathematical function based on a transfer function of the transistor model of the circuit.

14. The article of claim 11 wherein the computer-readable medium stores computer-executable instructions for causing the computer to:
produce a first behavioral model using a mathematical function to represent the transistor model of the circuit.

15. The article of claim 11 wherein the computer-readable medium stores computer-executable instructions for causing the computer to:
measure timing variations associated with the second behavioral model.

16. The article of claim 15 wherein the computer-readable medium stores computer-executable instructions for causing the computer to:
measure timing variations associated with the second behavioral model using time-to-digital-conversion techniques to measure the timing variations.

17. The article of claim 11 wherein the computer-readable medium stores computer-executable instructions for causing the computer to:
produce a first behavioral model using a hardware description language to produce the first behavioral model.

18. The article of claim 11 wherein the computer-readable medium stores computer-executable instructions for causing the computer to:
produce a first behavioral model of a timing circuit.

19. The article of claim 11 wherein the computer-readable medium stores computer-executable instructions for causing the computer to:
produce a second behavioral model of a timing circuit coupled to a substrate.

20. An apparatus comprising:
a memory for storing instructions; and
a processor coupled to the memory to execute the instructions to cause the processor to:
produce a first behavioral model of a circuit based on a transistor model of the circuit,
produce a second behavioral model of a noise source of a substrate coupled to the circuit based on the first behavioral model and based on a transistor model of the noise source, and
generate a response of the second behavioral model to an input signal from a simulation signal source.

21. The apparatus of claim 20 wherein the processor is configured to execute instructions to cause the processor to:
produce a transfer function of the transistor model of the circuit using radio-frequency analysis techniques.

22. The apparatus of claim 20 wherein the processor is configured to execute instructions to cause the processor to:
produce a first behavioral model using a mathematical function based on a transfer function of the transistor model of the circuit.

23. The apparatus of claim 20 wherein the processor is configured to execute instructions to cause the processor to:
produce a mathematical function based on a transfer function of the transistor model of the circuit.

24. The apparatus of claim 20 wherein the processor is configured to execute instructions to cause the processor to:
produce a mathematical function representing the transistor model of the circuit.

25. The apparatus of claim 20 wherein the processor is configured to execute instructions to cause the processor to:
measure timing variations associated with the second behavioral model.

26. The apparatus of claim 25 wherein the processor is configured to execute instructions to cause the processor to:
apply noise reduction techniques to the transistor model of the substrate based on results of the measured timing variations.

27. The apparatus of claim 20 wherein the processor is configured to execute instructions to cause the processor to:
measure timing variations associated with the second behavioral model using time-to-digital-conversion techniques.

28. The apparatus of claim 20 wherein the processor is configured to execute instructions to cause the processor to:
produce a first behavioral model using a hardware description language.

29. The apparatus of claim 20 wherein the processor is configured to execute instructions to cause the processor to:
produce a first behavioral model of a timing circuit.

30. The apparatus of claim 20 wherein the processor is configured to execute instructions to cause the processor to:
produce a second behavioral of a timing circuit coupled to a substrate.

* * * * *